UNITED STATES PATENT OFFICE 2,563,796

MANUFACTURE OF AROMATIC DIAZONIUM FLUORIDES AND CORRESPONDING AROMATIC FLUORIDES

Wilbur J. Shenk, Jr., and George R. Pellon, Cleveland, Ohio, assignors to The Harshaw Chemical Company, Cleveland, Ohio, a corporation of Ohio No Drawing. Application May 26, 1948,
Serial No. 29,418

10 Claims. (Cl. 260—650)

This invention relates to the preparation of primary aromatic diazonium fluorides having six nuclear carbon atoms and thermal decomposition products thereof, such thermal decomposition products comprising the corresponding aromatic fluorides.

The standard method for the production of aromatic fluorides is the thermal decomposition of diazonium fluoborates according to the following reaction:

$$C_6H_5N_2BF_4 \rightarrow C_6H_5F + N_2 + BF_3$$

In accordance with this process, in order to produce an aromatic fluoride it is necessary to produce the corresponding diazonium fluoborate and isolate and purify the same and then thermally decompose it. Another process of making aromatic fluorides is described in German Patent No. 600,706. This patent discloses diazotization of primary aromatic amines by the use of sodium nitrite in anhydrous hydrogen fluoride. A solution is made of the primary aromatic amine and anhydrous hydrogen fluoride and to such mixture is added solid sodium nitrite, the temperature being kept down by refrigeration to 5° C. After the diazotization is complete, the temperature is raised to 30-40° C. whereupon the aromatic diazonium fluoride decomposes, yielding nitrogen and the corresponding aromatic fluoride.

We have now discovered that primary aromatic mono-amines having six nuclear carbon atoms can be converted to the corresponding primary aromatic diazonium fluorides by diazotizing with nitrosyl chloride in liquid, anhydrous hydrogen fluoride. In accordance with our invention, the primary aromatic mono-amine corresponding to the aromatic diazonium fluoride to be produced is dissolved in liquid, anhydrous hydrogen fluoride at atmospheric or higher or lower pressure and the nitrosyl chloride in gaseous state is bubbled into the solution, the temperature of the reaction mixture preferably being kept at from 15° C. to 50° C. during diazotization. Although we do not know with certainty how the reaction proceeds, it is probable that the aromatic amine reacts to form the corresponding aromatic diazonium. This compound, if actually formed, is probably of only instantaneous duration, being immediately converted to the corresponding aromatic diazonium fluoride while hydrogen chloride is evolved. Whether or not this is the mechanism of the reaction, it seems to be a plausible explanation in view of the fact that gaseous hydrogen chloride is evolved. (Some water is formed in the diazotization reaction and some hydrogen chloride dissolves in such water.)

So far as we are aware, no one has previously suggested the use of nitrosyl chloride for diazotization of aromatic amines in anhydrous hydrogen fluoride and, indeed, it was hardly to be expected that NOCl could be used for such purpose without undue contamination of the product with aromatic chlorides and co-products.

Primary aromatic mono-amines are soluble in liquid, anhydrous hydrogen fluoride. Aniline and substitution products thereof wherein one or two of the nuclear carbons have the hydrogen atom replaced by a substituent of the group: aryl, alkyl, chloro, nitro, hydroxy, carboxy and sulfonate may be diazotized in anhydrous HF by means of nitrosyl chloride. Following are specific examples of such primary aromatic mono-amines which may be thus diazotized:

2-amino-5-chloro-p-toluenesulfonic acid
2-amino-5-nitrobenzenesulfonic acid
2-amino-4-nitrophenol
2-amino-1-phenol-4-sulfonic acid
4-amino-m-toluene sulfonic acid
m-aminophenol
Aniline
4-chloro-o-anisidine
2-chloro-4-nitroaniline
4-chloro-o-toluidine
2,5-dichloroaniline
m-nitroaniline
2-nitro-p-anisidine
4-nitro-o-anisidine
2-nitro-p-toluidine
Sulfanilic acid
o-toluidine
p-toluidine
2,4-xylidene
p-aminobenzoic acid
Anthranilic acid The anhydrous hydrogen fluoride is employed in excess of the amount required for the reaction. It may be, for example, 2 or 3 up to 10 or more (preferably 5 to 6) times the amount required by the equation:

$$R\text{---}NH_2 + NOCl + HF \rightarrow C_6H_5N_2F + HCl + H_2O$$

Surprisingly the above reaction can be carried out successfully at a diazotization temperature substantially higher than in the case where sodium nitrite is used. This higher diazotization temperature is possible only with NOCl and only in anhydrous HF so far as we know. The diazotization of aniline was carried out according to the German patent (above referred to) at 5° C. We found it desirable to use an even lower temperature in repeating the process therein described. However, when diazotizing with nitrosyl chloride, a temperature of 20 to 30° C. is preferable while 15° C. to 50° C. can be successfully used. Further advantages resulting from the use of nitrosyl chloride instead of sodium nitrite are the absence of soda salts in the reaction mixture and the reduced amount of heat liberated during the process.

Operating at the higher temperature, which is, of course, preferable from a cost standpoint, makes it unnecessary to maintain a sharp separation between the step of diazotization and the step of decomposition of the diazonium fluoride and these steps can be and preferably are carried on in substantial degree at the same time. That is, diazotization may be carried out above the temperature at which the aromatic fluoride decomposes rapidly so that the concentration of the latter in the anhydrous hydrogen fluoride does not build up very much. Reaction temperatures between 20° C. and 50° C. are suitable for realizing simultaneous diazotization and decomposition of the diazonium fluoride to a practical degree. In that temperature range, the aromatic diazonium fluoride breaks down concurrently with the diazotization reaction to yield the aromatic fluoride. Since the rate of decomposition of the diazonium fluoride is slower than that of its formation, it is necessary to continue the decomposition of the aromatic diazonium fluoride after the diazotization is completed, if desired at a higher temperature than the diazotization temperature, so as to complete the decomposition. Some aromatic chlorides are formed but the percentage is surprisingly low and they may be easily separated from the aromatic fluoride by distillation.

Not only the primary aromatic mono-amines but other primary cyclic mono-amines having six nuclear atoms, five of which are carbon, and having three nuclear double bonds, can be diazotized in like manner, these compounds having many aromatic properties, and the corresponding diazonium fluorides can be thermally decomposed in like manner to yield fluorides corresponding to the aromatic fluorides described. Substitution products of 2-aminopyridine wherein one or two nuclear carbon atoms have the hydrogen atom replaced by a substituent of the group: alkyl, aryl, chloro, nitro, hydroxy, carboxy, alkoxy or sulfonate may be diazotized in liquid anhydrous hydrogen fluoride by means of nitrosyl chloride. The following specific examples will serve to illustrate the invention, it being understood that the various details and conditions are illustrative only and that the benefits of the invention may be realized under various other conditions than those set forth in these examples and by the use of aromatic amines other than those mentioned in these examples.

*Example I*

A Monel autoclave of 1.4 liters capacity was used as a reactor. It was equipped with a nickel condenser and thermometer well, a Monel stirrer and two nickel inlet tubes, one for the addition of anhydrous hydrogen fluoride and the aromatic amine and the other for introducing nitrosyl chloride beneath the surface of the reaction mixture. The reactor was cooled to 0° C. by an ice bath, the condenser was cooled to −20° C. by the use of a Dry Ice-trichloroethylene mixture and 676 g. of anhydrous HF was run as a liquid directly into the reactor. The stirrer was started and 440 g. of aniline was added in about 10 minutes, the temperature of the mixture rising to 32° C. The mixture was cooled to 20° C. and nitrosyl chloride was bubbled into it at an initial rate of 140 g. per hour. HCl and nitrogen were evolved. This rate of addition of NOCl was maintained until NOCl began to issue from the condenser (about two hours) when the rate was reduced to 80 g. per hour. A total of 360 g. was added over a three hour period during which the temperature of the reaction mixture was maintained at 20–23° C. The cooling bath was then removed and the temperature gradually rose to 40° C. due to the heat of decomposition of the diazonium fluoride. After decomposition was complete the reaction mixture was poured into iced salt water, the lower aqueous layer was siphoned off, the fluorobenzene layer was made alkaline with caustic potash and steam distilled. The fluorobenzene was separated from the water in the steam distillate, dried over calcium chloride and fractionally distilled. The yield of fluorobenzene, B. P. 84–85° C., was 332 g. or 73% of theory. Ten grams of higher boiling compounds which were later shown to be largely chlorobenzene remained in the distilling flask. On this basis about 3% of the total product was chlorobenzene.

*Example II*

The same reaction was run on a somewhat larger scale in steel equipment, a 5.7 liter mild steel autoclave being used. In this case 1000 g. of aniline, 1400 g. of anhydrous HF and 840 g. of NOCl were used. The reaction mixture was held at 24–26° C. during the addition of the NOCl which was added at an initial rate of 300 g. per hour and then reduced to about 150 g. per hour. In this case the fluorobenzene which is present as a separate upper layer in the reactor at the end of the reaction was siphoned off directly, neutralized and steam distilled. The crude yield after drying with calcium chloride was 790 g. Fractional distillation gave 740 g. of fluorobenzene, B. P. 84–85° C., and 50 g. of residue, principally chlorobenzene.

*Example III*

Metafluorotoluene was prepared in the equipment described in Example I. To a mixture of 482 g. of metatoluidine and 630 g. of anhydrous HF, 360 g. of NOCl was added in 2 hours and 30 minutes at a temperature of 20–22° C. Otherwise the conditions of Example I were followed. The cooling bath was then removed and the temperature of the reaction mixture gradually rose to 40° C. as decomposition of the diazonium fluoride proceeded to completion. The metafluorotoluene was isolated in a manner similar to that described in Example I. The crude yield after drying over calcium chloride was 382 g. Fractional distillation gave 365 g. (or 74% of theory) of metafluorotoluene, B. P. 115–116° C. and 15 g. of higher boiling material which was presumably largely metachlorotoluene.

*Example IV*

2-fluoropyridine was prepared in the equipment described in Example I and under the same temperature conditions. To a mixture of 423 g. of 2-aminopyridine and 640 g. of anhydrous HF, 390 g. of NOCl was added initially at a rate of 130 g. per hour and finally at a rate of 55 g. per hour. In this case decomposition of the diazonium fluoride apparently took place almost as rapidly as the diazotization of the amine and the resulting sweep of nitrogen tended to carry the NOCl out of the reactor necessitating a somewhat slower rate of addition. After completion of the decomposition reaction, the reflux condenser was set for downward distillation and most of the HF was removed by distillation. The residue was then poured into ice, neutralized with caustic potash and steam distilled. The 2-fluoropyridine was then separated from the water in the steam distillate, dried over potassium carbonate and fractionally distilled. The yield of 2-fluoropyridine, B. P. 125–127° C., was 270 g. In this case the higher boiling compounds amounted to 37 g.

*Example V*

The preparation described in Example I was carried out at an operating pressure of 15 p. s. i. gauge. To a mixture of 438 g. of aniline and 683 g. of anhydrous HF, 374 g. of nitrosyl chloride was added at a reaction temperature of 24–26° C. over a period of two hours. The pressure was maintained at 15 p. s. i. gauge by allowing the gaseous waste products of the reaction (HCl and $N_2$) to bleed off through a fine needle valve at the top of the condenser (kept at −10° C.). After the nitrosyl chloride had been added, the reaction mixture was gradually warmed to 50° C. to complete the decomposition step, the end of which is indicated by the pressure in the system remaining constant when the needle valve is closed. The reaction mixture was then worked up as described in Example I. The yield was 330 g. or 73% of theory.

Having thus described our invention, what we claim is:

1. In a process for making aromatic fluorine compounds, the step of dissolving a primary aromatic mono-amine having six and only six nuclear carbon atoms, in an excess of liquid, anhydrous hydrogen fluoride and passing into such solution gaseous NOCl at a temperature from 15° C. to 50° C.

2. A process as defined in claim 1 wherein said primary aromatic mono-amine is aniline.

3. A process as defined in claim 1 wherein said primary aromatic mono-amine is a toluidine.

4. In a process for making aromatic fluorides the step of dissolving a primary aromatic mono-amine having six and only six nuclear carbon atoms in an excess of liquid, anhydrous hydrogen fluoride and passing into such solution gaseous NOCl at a temperature from 20° C. to 50° C. whereby decomposition of the diazonium fluoride proceeds concurrently with the diazotization reaction.

5. A process as defined in claim 4 wherein said primary aromatic mono-amine is aniline.

6. A process as defined in claim 4 wherein said primary aromatic mono-amine is a toluidine.

7. In a process for making aromatic fluorine compounds from primary aromatic amines with minimum formation of aromatic chlorides, the steps of dissolving a primary aromatic mono-amine having six and only six nuclear carbon atoms, in an excess of liquid, anhydrous hydrogen fluoride, and passing into such solution gaseous NOCl in a temperature range from 15° C. to 50° C. whereby to convert the amino group of such primary aromatic mono-amine to a diazonium fluoride group, the temperature of the reaction mixture being maintained between 15° C. and 50° C. until the diazotization reaction is substantially complete and between 20° C. and 50° C. thereafter until the decomposition of the diazonium fluoride is substantially complete.

8. In a process for making cyclic fluorides from primary cyclic mono-amines with minimum formation of aromatic chlorides, the step of dissolving in liquid anhydrous hydrogen fluoride a primary cyclic mono-amine having six and only six nuclear atoms, at least five of which are carbon and one of which is selected from the class consisting of carbon and nitrogen, and three nuclear double bonds, the amino group being extra-nuclear and attached to nuclear carbon, and passing into such solution gaseous NOCl in a temperature range from 15° C. to 50° C. whereby to convert the amino group of such primary cyclic amine to a diazonium fluoride group, the temperature of the reaction mixture being maintained between 15° C. and 50° C. until the diazotization reaction is substantially complete and between 20° C. and 50° C. thereafter until the decomposition of the diazonium fluoride is substantially complete.

9. A process as defined in claim 7 wherein further the temperature of the reaction mixture is maintained in the range between 40° C. and 50° C. after the diazotization reaction is substantially complete until the decomposition of the diazonium fluoride is substantially complete.

10. A process as defined in claim 8 wherein further the temperature of the reaction mixture is maintained in the range between 40° C. and 50° C. after the diazotization reaction is substantially complete until the decomposition of the diazonium fluoride is substantially complete.

WILBUR J. SHENK, Jr.
GEORGE R. PELLON

REFERENCES CITED

The following references are of record in the file of this patent:

UNITED STATES PATENTS

| Number | Name | Date |
|---|---|---|
| 2,086,986 | Moyer | July 13, 1937 |
| 2,361,590 | Biggs | Oct. 31, 1944 |
| 2,361,591 | Biggs | Oct. 31, 1944 |

FOREIGN PATENTS

| Number | Country | Date |
|---|---|---|
| 96,153 | Germany | 1896 |
| 600,706 | Germany | 1933 |

OTHER REFERENCES

FIAT, Final Report 998 (PB 77670), pages 1–5. March 31, 1947.